(12) United States Patent
Hendriks et al.

(10) Patent No.: US 10,730,589 B2
(45) Date of Patent: Aug. 4, 2020

(54) VESSEL PROVIDED WITH A MOON POOL

(71) Applicant: GustoMSC Resources B.V., Schiedam (NL)

(72) Inventors: Sjoerd Maarten Hendriks, Schiedam (NL); Jan-Willem Krijger, Schiedam (NL); Dimitrios Chalkias, Schiedam (NL)

(73) Assignee: GustoMSC B.V., Schiedam (NL)

( * ) Notice: Subject to any disclaimer, the term of this patent is extended or adjusted under 35 U.S.C. 154(b) by 0 days.

(21) Appl. No.: 15/571,756

(22) PCT Filed: May 4, 2016

(86) PCT No.: PCT/NL2016/050321
§ 371 (c)(1),
(2) Date: Nov. 3, 2017

(87) PCT Pub. No.: WO2016/178575
PCT Pub. Date: Nov. 10, 2016

(65) Prior Publication Data
US 2018/0134345 A1  May 17, 2018

(30) Foreign Application Priority Data
May 4, 2015 (NL) ..................... 2014763

(51) Int. Cl.
*B63B 3/14* (2006.01)
*B63B 1/32* (2006.01)
(Continued)

(52) U.S. Cl.
CPC ............. *B63B 3/14* (2013.01); *B63B 1/32* (2013.01); *B63B 35/03* (2013.01);
(Continued)

(58) Field of Classification Search
CPC ....... B63B 35/03; B63B 35/4413; B63B 1/32; B63B 2003/147; Y02T 70/12
(Continued)

(56) References Cited

U.S. PATENT DOCUMENTS 3,585,806 A * 6/1971 Lawrence ............... B63B 35/03
  405/166
5,573,353 A * 11/1996 Recalde .................... F16L 1/19
  405/168.1
(Continued)

FOREIGN PATENT DOCUMENTS

| CN | 1119259 C | 8/2003 |
| CN | 102196960 A | 9/2011 |

(Continued)

OTHER PUBLICATIONS

Oct. 26, 2016—International Search Report and Written Opinion of PCT/NL2016/050321.
(Continued)

*Primary Examiner* — Anthony D Wiest
(74) *Attorney, Agent, or Firm* — Banner & Witcoff, Ltd.

(57) ABSTRACT

The invention relates to a vessel (1), especially a drillship or so-called drilling ship. The vessel comprises a hull (3) having a bottom surface (5) and a deck (7). Said vessel is provided with a moon pool (2), which extends from said bottom surface of the hull in an upward direction through the hull. Further, said vessel is provided with a cavity (10) located at a front side of the moon pool. Said cavity is at least partly open at a bottom side thereof in order to allow water to flow into said cavity. Moreover, said cavity is at least partly open at a rear side of said cavity in order to allow water to flow directly from said cavity into the moon pool,
(Continued)

as a result of which moon pool sloshing can be diminished and the mean flow resistance of the vessel when sailing can be reduced.

18 Claims, 6 Drawing Sheets

(51) Int. Cl.
*B63B 35/44* (2006.01)
*B63B 35/03* (2006.01)

(52) U.S. Cl.
CPC .... *B63B 35/4413* (2013.01); *B63B 2003/147* (2013.01); *Y02T 70/12* (2013.01)

(58) Field of Classification Search
USPC ............................................. 441/3; 114/65 R
See application file for complete search history.

(56) References Cited

U.S. PATENT DOCUMENTS

| | | | |
|---|---|---|---|
| 6,397,770 | B1 | 6/2002 | Syvertsen et al. |
| 8,327,783 | B2 | 12/2012 | Son et al. |
| 2011/0197802 | A1 | 8/2011 | Son et al. |
| 2014/0202371 | A1 | 7/2014 | Lee et al. |
| 2015/0060137 | A1* | 3/2015 | Deul ..................... B63B 35/42 175/5 |

FOREIGN PATENT DOCUMENTS

| | | |
|---|---|---|
| CN | 202935532 U | 5/2013 |
| CN | 203819474 U | 9/2014 |
| EP | 1053171 A1 | 11/2000 |
| EP | 2 374 708 A1 | 10/2011 |
| GB | 2356174 A | 5/2001 |
| JP | S52001886 A | 1/1977 |
| JP | S6297898 U | 6/1987 |
| KR | 20000025585 A | 5/2000 |
| KR | 20130016821 A | 2/2013 |
| KR | 20130082012 A | 7/2013 |
| KR | 20140028325 A | 3/2014 |
| WO | 9939971 A1 | 8/1999 |
| WO | 2008088223 A1 | 7/2008 |

OTHER PUBLICATIONS

Hammargren et al. (2012) "Effect of the Moonpool on the Total Resistance of a Drillship" Chalmers Univ. of Tech, Göteburg, SE.

Wang et al. "CFD Simulation of Water Oscillations in the Moonpool of a Drillship".

Jul. 25, 2018 (SG) Search Report and Written Opinion—App. 11201709099T.

Van't Veer, R., Tholen, H.J. (2008): Added resistance of moonpools in calm water, OMAE2008-57246.

Son, H.J., Pak, K.R., Kim, S., Kim, B. (2015): Reduction of Drillship's Moonpool Drag during Transit, SNAME WMTC2015.

\* cited by examiner

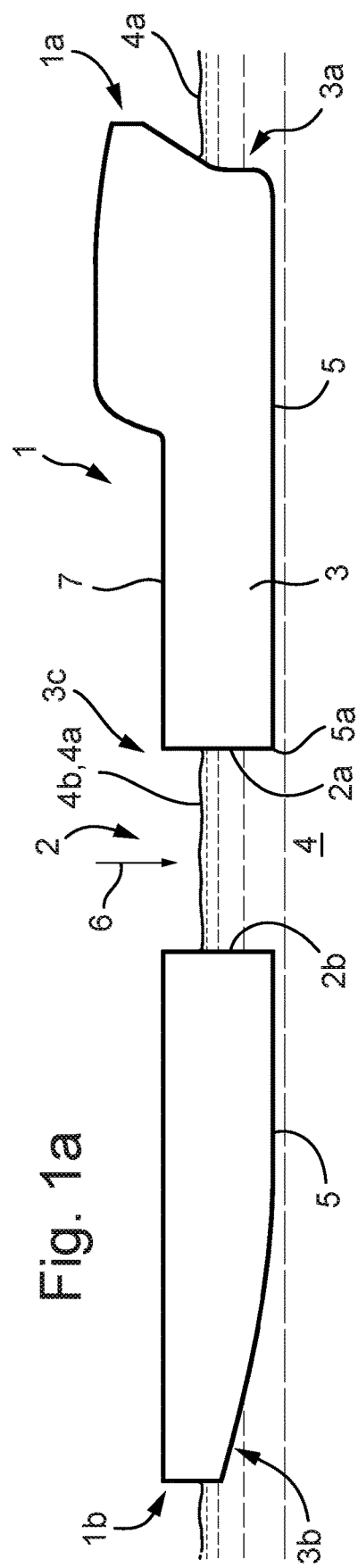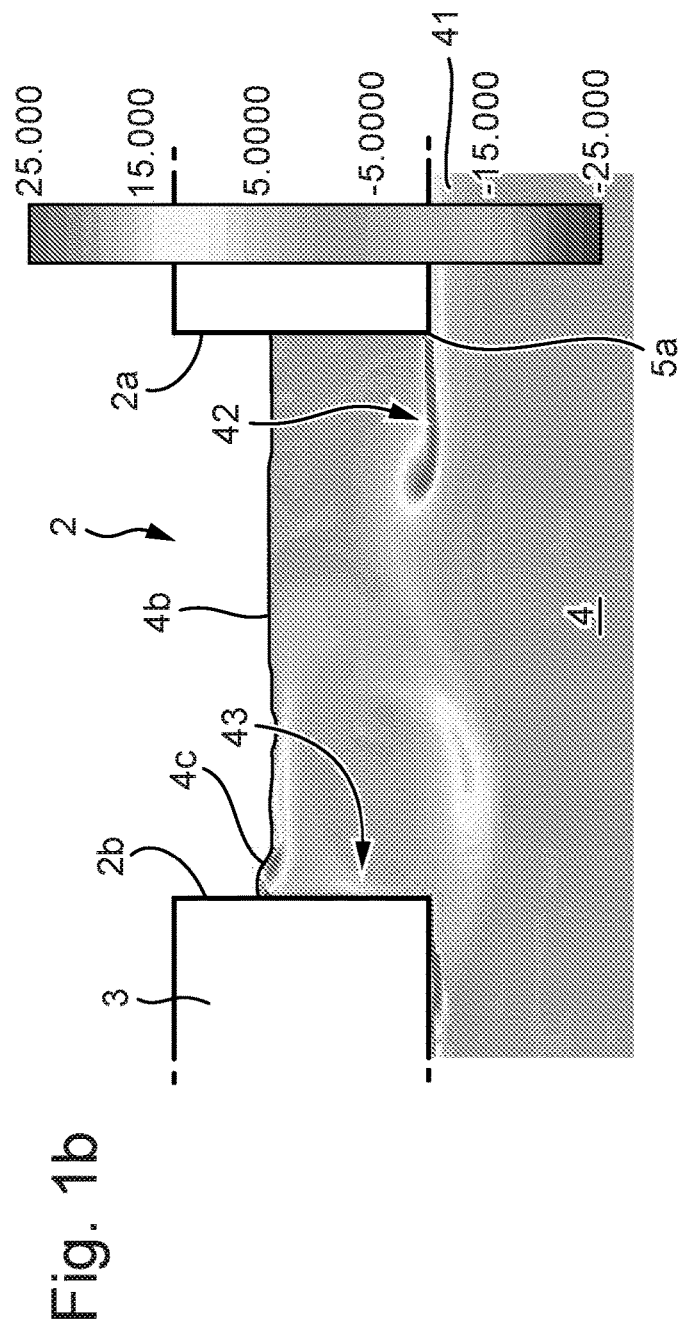

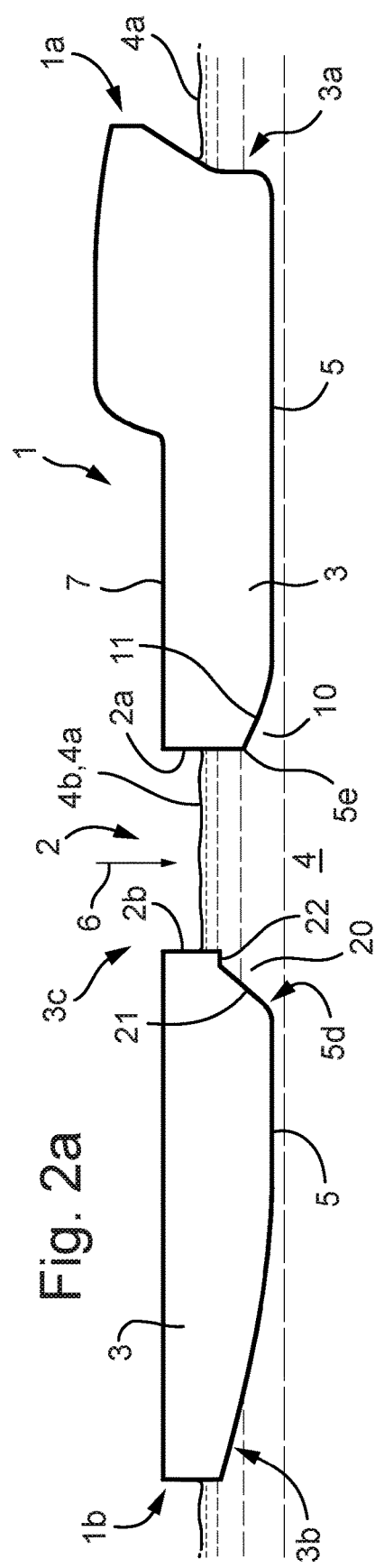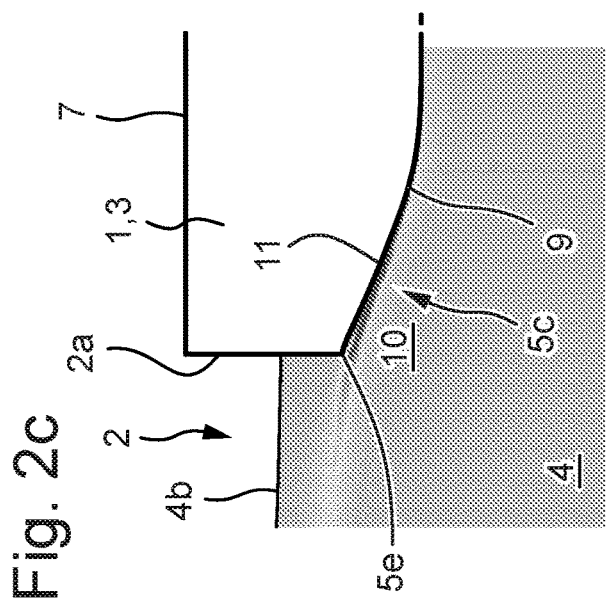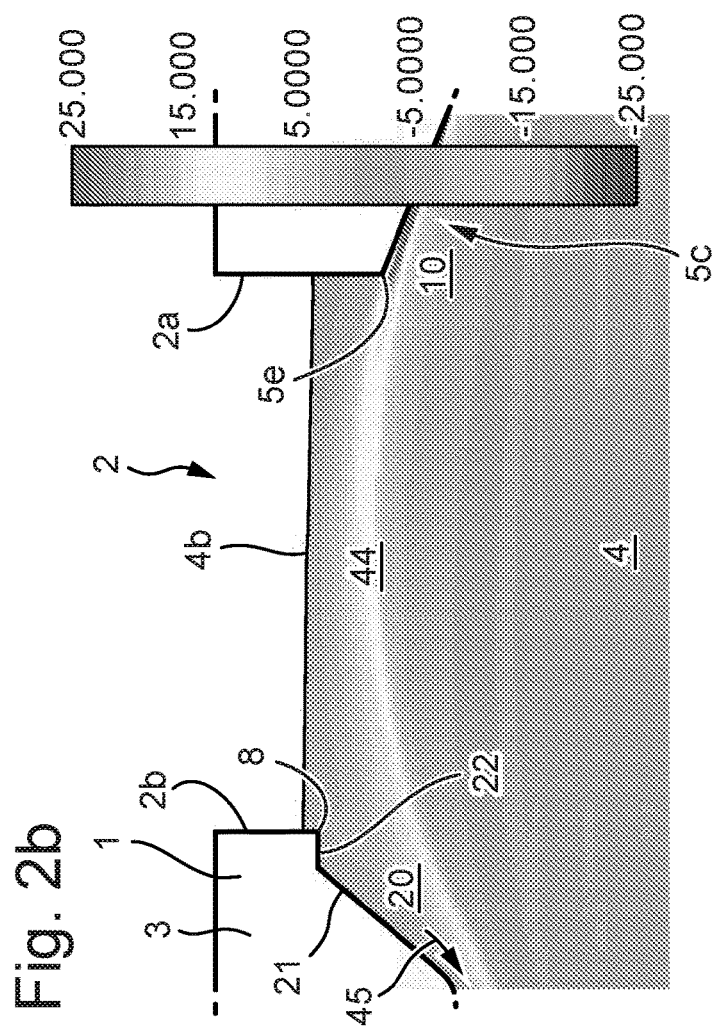

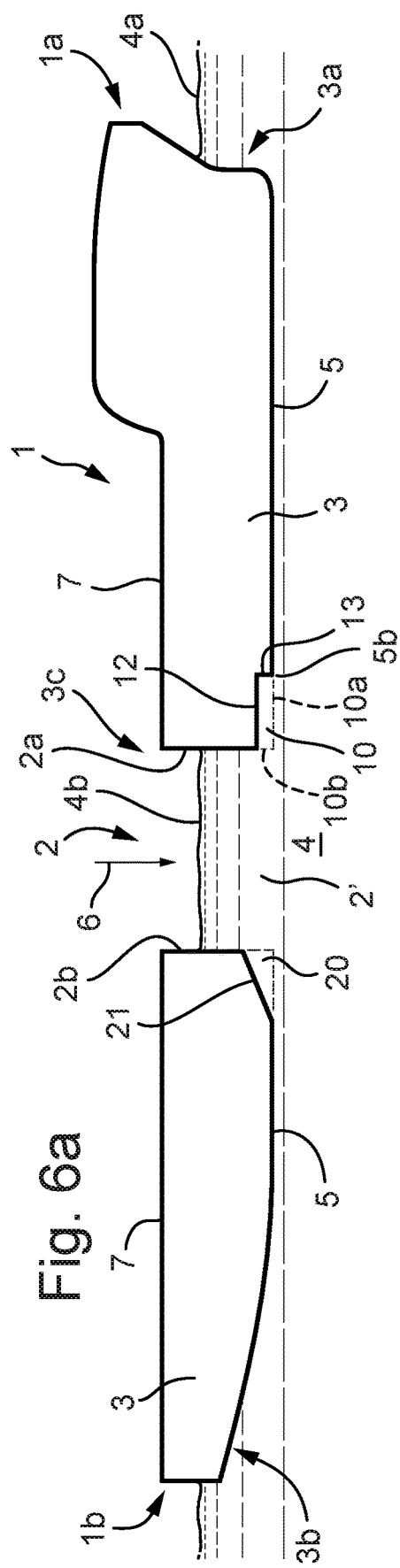
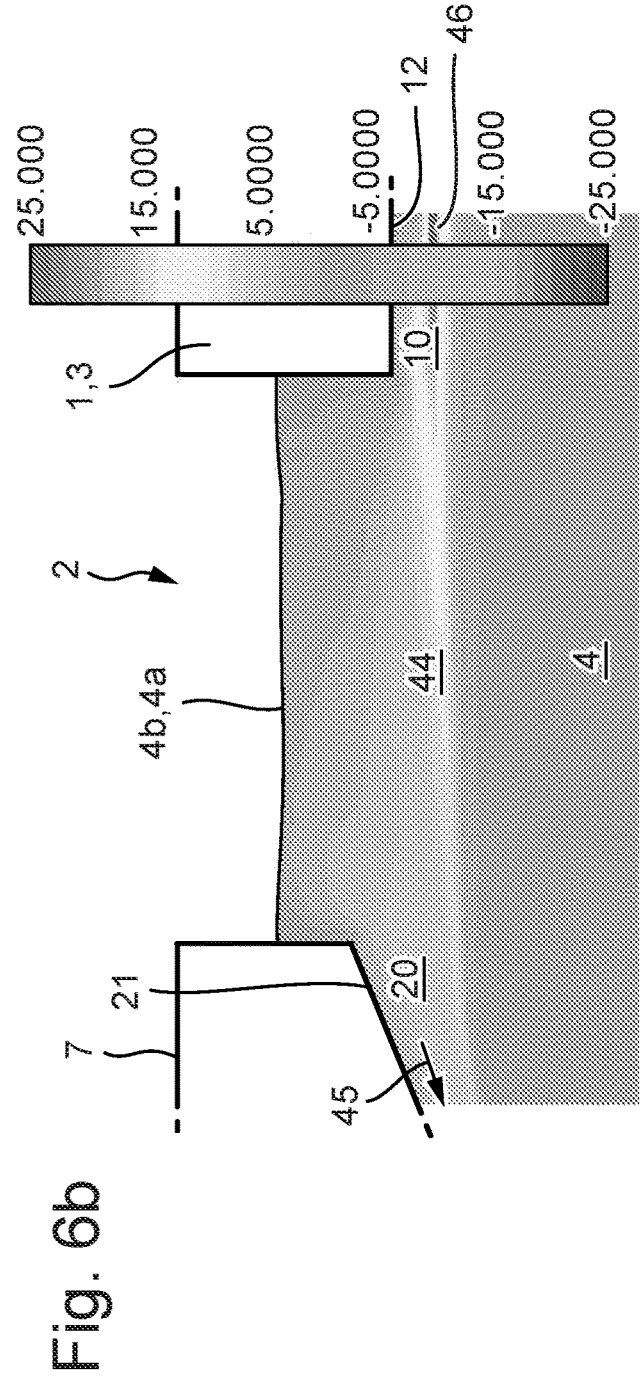
Fig. 6a
Fig. 6b

VESSEL PROVIDED WITH A MOON POOL

CROSS-REFERENCE TO RELATED APPLICATIONS

This application is a U.S. National Stage application under 35 U.S.C. § 371 of International Application PCT/NL2016/050321 (published as WO 2016/178575 A1), filed May 4, 2016 which claims the benefit of priority to Application NL 2014763, filed May 4, 2015. Benefit of the filing date of each of these prior applications is hereby claimed. Each of these prior applications is hereby incorporated by reference in its entirety.

The invention is generally related to the field of vessels, such as drilling ships, or so-called drillships, or pipelay vessels, which vessels are provided a moon pool.

A moon pool provides an opening in a hull of the vessel to allow access to the water below the bottom surface of the hull. Usually, the moon pool is located at or near the centre of the hull of the vessel.

It is noted that the moon pool can for example be used to lower equipment, for instance drilling equipment, such as drilling pipes or mining pipes, into the water from the vessel and/or to raise equipment from the water. Through the moon pool, drilling assembly and/or other assemblies can thus be passed, for instance while a well is being drilled, completed, or abandoned.

The moon pool can be formed a walled passage or hole in the hull of the vessel. Often, said walled hole has a substantially tubular shape. The passage formed by the moon pool normally extends in a substantially vertical direction and can then for instance have a substantially horizontal cross-section having a substantially rectangular or square shape.

Vessels provided with a moon pool are often used as a drillship, e.g. a vessel which can be arranged for drilling, especially deep sea drilling, and which vessel preferably can sail with its own locomotive power.

Although a moon pool can be a very advantageous feature of a vessel, especially of a drillship, when performing work on location, the moon pool can also be disadvantageous during sailing, for instance in terms of sailing performances.

A disadvantage of a moon pool may be that during transit of a vessel provided with such moon pool, said vessel can experience moon pool sloshing, which can be considered as back and forth motion of water between a front wall and a rear wall of the moon pool. Said moon pool sloshing for example can increase the mean flow resistance of the vessel, can slow down the vessel, can increase fuel consumption, can exert an oscillatory load on a propulsion system of the vessel, can cause vortex-induced vibrations in the vessel and/or can make the ride uncomfortable for the crew of the vessel. It is noted that it has been observed that for certain sailing speeds the mean flow resistance of the vessel can increase by up to 50% due to moon pool sloshing.

Different solutions have been proposed to counteract moon pool sloshing and/or negative effects thereof.

For example, moon pools have been proposed that are provided with a vortex suppression block, which block is located at the lower portion of a moon pool front wall and which block extends substantially horizontally into the moon pool. Such moon pools with vortex suppression blocks are for instance known from US patent publication US 2014/0 202 371. However, a disadvantage of such vortex suppression blocks is that a front part of the moon pool cannot be used to lower or raise equipment. Another disadvantage is that, especially when the water visibility is low, the vortex suppression block extending below the water line can be accidently damaged by equipment lowered into the moon pool and/or equipment lowered into the moon pool can be accidently damaged by the vortex suppression block.

Another solution is proposed in US patent publication US 2011/0 197 802. Said publication discloses a moon pool with a rectangular horizontal cross-section passing through the ship in a vertical direction, wherein at a rear side of the moon pool a second vertical passage through the ship is provided, which second vertical passage is in fluid connection with the first vertical passage formed by the moon pool. It is said that, as a result of said second passage, which has a reduced width with respect to the width of the moon pool, the amplitude of a sloshing movement and the additional flow resistance of the ship caused by the sloshing movement of water inside the moon pool while sailing can be reduced. However, due to the second vertical passage, the deck is penetrated for a relatively large extent, which is disadvantageous. Besides, although the moon pool sloshing can be reduced, the reduced sloshing still is unwanted. Proposals disclosed in US 2011/0 197 802 for further reducing the sloshing include elements such as a partition wall and base plates provided in the space formed by the two vertical passages can have the same disadvantages as the suppression block mentioned above. For example, such elements, which are substantially placed below the water line, can be damaged by equipment and/or can damage equipment.

Japanese patent publication S52-001 886 discloses a drilling ship with a moon pool with a lowered deck around said moon pool. Due to the low level of the lowered deck, a ship can have serious problems with a water moving in a piston mode, e.g. a mode in which the water inside the moon pool heaves up and down more or less like a solid body. In order to counteract such a piston mode, a cavity is provided in the hull of the ship, which cavity is located at the rear end of the moon pool and is formed as a chamfer. The cavity is in fluid communication with the moon pool. The chamfer is defined by a sloping wall which is intended to act as a guide intended to smoothly lead seawater backwardly out of the moon pool. Nevertheless, such a drilling ship can still encounter serious piston mode water movement. Besides, serious moon pool sloshing may occur. In a further embodiment, shown in FIGS. 3a-3c of Japanese patent publication S52-001 886, a large lip is provided which extends the front wall of the moon pool below the bottom surface of the hull of the ship in order to counteract that seawater will flow into the moon pool. However, such lip will increase the water resistance of the ship when sailing. Besides, such lip can be a disadvantage when sailing in shallow waters. Further, Japanese patent publication S52-001 886 discloses a third embodiment, show in its FIGS. 2a-2b, wherein a second cavity is formed at a front side of the moon pool. Said second cavity is formed as a prismatic room segregated from the moon pool by means of a lip which forms a part of the front wall of the moon pool. Seawater which flows along the bottom surface of the ship from the bow rearwards can, when it reaches the prismatic room, be guided into said room by an upwardly sloping wall. The lip segregating said room from the moon pool can prevent that said flow flows into the moon pool from said prismatic room. However, a ship with a moon pool according to said embodiment will still encounter serious moon pool sloshing and will have a relatively high flow resistance.

Furthermore, many devices have been proposed to temporarily close off the moon pool, e.g. by a means of a lid positioned near the bottom of the hull of the vessel. However, mounting or dismounting the moon pool devices may involve complicated, dangerous, and/or time-consuming operations, which often needs deploying divers.

European patent publication EP 2 374 708 discloses a lattice device for placement near the bottom of the moon pool which is arranged to diminish flow resistance and which is pivotably mounted in the moon pool in order to be moved from a transit position in which it diminishes flow resistance into a working position in which equipment can pass through the moon pool. Although said device seems to improve the flow resistance relatively well, said device and the use thereof can be for example relatively complex, relatively error-prone, relatively time-consuming and/or relatively expensive.

An object of the present disclosure is to provide an alternative vessel having a moon pool. It is an object of the invention to alleviate or solve at least one of the disadvantages associated with one or more prior art vessels having a moon pool, especially one or more disadvantages mentioned above, and/or to obtain advantages above said prior art vessels. In particular, the invention aims at providing a vessel including a moon pool, wherein on the one hand flow resistance can relatively low, e.g. in comparison to a traditional vessel having a moon pool and lacking any moon pool sloshing reduction means, and wherein on the other hand the design of the vessel is relatively simple, relatively sturdy, relatively error insensitive, relatively cheap, and/or relatively easy and/or economic to use.

Thereto, the invention provides for a vessel, especially a drillship or so-called drilling ship, which vessel comprises a hull having a bottom surface and a deck, wherein said vessel is provided with a moon pool extending from said bottom surface of the hull in an upward direction through the hull, wherein said vessel is further provided with a cavity located at a front side of the moon pool, wherein said cavity is at least partly open at a bottom side thereof in order to allow water to flow into said cavity, and wherein said cavity is at least partly open at a rear side, or so-called aft side, of said cavity in order to allow water to flow directly from said cavity into the moon pool.

It is noted that during use of the vessel, especially during sailing, said cavity in front of the moon pool can be located substantially completely below the water line and/or that it can be substantially completely filled with water. Additionally or alternatively, during use, e.g. during sailing, a lower end of a front wall of the moon pool can be located below the water line. Additionally, in case a passage or fluid connection between the cavity and the moon pool is considered as a passage or a recess provided at a lower end of the front wall of the moon pool, an edge at the top side of such passage or recess, which then not is considered a lower end of the front wall, can be located below the water line.

By arranging the vessel such that an underwater cavity or so-called room is provided in front of the moon pool, which is at least partly open at its lower side and at its rear side, it can be counteracted that, when the vessel is sailing forwards, a water flow, which follows the lower surface of the hull and can be considered as so-called attached to said lower surface of the hull, will separate substantially from said lower surface of the hull at the bottom of a front wall of the moon pool and therefore it can also be counteracted that such separated flow will there cause a lot of vorticity inducing and amplifying oscillatory behaviour of water downstream of said point at the lower surface of the hull, where the hull opens into the moon pool. Since the occurrence of such oscillatory behaviour of water at a lower end of the moon pool at a location downstream of the front wall of the moon pool can be kept relatively small due to the cavity in front of the moon pool relatively little sloshing will occur in the moon pool. As a result thereof, the sailing resistance of a vessel, e.g. a drillship, when sailing can be improved, i.e. by reducing said resistance.

Advantageously, the vessel can further be provided with a second cavity, wherein said second cavity is located at a rear side of the moon pool, and wherein said second cavity is at least partly open at a front side of said second cavity in order to allow water to flow from said moon pool directly into said second cavity, and wherein said second cavity is at least partly open at a bottom side thereof in order to allow water to flow out of said second cavity. As a result, water, flowing into the moon pool from the first cavity and/or flowing into the moon pool at an open bottom side of said moon pool, can flow into the second cavity, e.g. in stead of that a rear wall of the moon pool bounces such water back in a forward direction into the moon pool. Hence, moon pool sloshing can be reduced even further.

It is noted that the first cavity and/or the second cavity can have a width corresponding with a width of the moon pool, e.g. can have a substantially similar width as said moon pool. Advantageously, a respective width of the respective cavity can be substantially similar with a respective width of the moon pool at a respective end, e.g. front end or rear end, thereof. Although the first cavity and/or the second cavity may have a substantially continue width along its length and/or along its height, the first cavity and/or the second cavity may alternatively have a changing width. For example, the first cavity may widen towards its rear side and/or the width of second cavity may widen towards its rear side. Alternatively or additionally, the width of the first cavity and/or the width of the second cavity may taper in an upward direction, i.e. side walls of the first and/or second cavity, or at least lower parts of said side walls, may fan out. The side walls of the moon pool may also taper in an upward direction, at least the lower parts corresponding with the tapered lower parts of said side walls of the first and second cavity, thereby connecting the shape of the cavities.

In embodiments, said second cavity can be at least partly defined by means of a trailing wall sloping downwards in a rearward direction, e.g. in a direction substantially extending from the moon pool towards a portion of the bottom surface of the hull located at a rear side of the moon pool. It is noted that the trailing wall can for instance substantially form a chamfer, especially a chamfer connecting a rear wall of the moon pool with the bottom surface of the hull. As a result of the downwardly sloping trailing wall, water flowing through the moon pool from the front cavity towards the second cavity behind the moon pool can be diverged in a downward direction away from the moon pool in a relatively smooth manner, thereby counteracting moon pool sloshing. Advantageously, said downwardly sloping trailing wall can substantially extend in a direction deviating from a longitudinal direction of the vessel or ship and/or from a substantially the horizontal direction under an angle of between 25° and 65°, preferably an angle larger than 30° or even larger than 35° or 40° and/or smaller than 60° or even smaller than 55° or 50°, such as for instance an angle of about 45°.

It is noted that the horizontal direction can be considered as a direction which is horizontal when the vessel is floating on smooth waters, e.g. a calm sea.

Optionally, the connection between the downwardly sloping trailing wall and the bottom surface of the hull, or at least a part of said downwardly trailing wall and preferably substantially the complete downwardly trailing wall, can be formed by a fillet, spline or any continuous curve. In embodiments, said fillet can be considered as a rounding off of an exterior corner between said trailing wall and said bottom surface. By employing a fillet, spline or any continuous curve a smooth transition of said trailing wall into said bottom surface can be formed, as a result of which a flow following the downwardly sloping trailing wall can stay substantially attached to the hull and can substantially follow the bottom surface of the hull when reaching the end of the downwardly sloping trailing wall. Therefore, water can smoothly leave the moon pool and interference drag may be reduced, as result of which sailing performances may be increased.

It is noted that during use of the vessel, especially during sailing, the second cavity, which is located at the rear side of the moon pool, can be located substantially completely below the water line and/or that it can be substantially completely filled with water. Additionally or alternatively, during use, e.g. during sailing, a lower end of a rear wall of the moon pool can be located below the water line. Additionally, in case a passage or fluid connection between the second cavity and the moon pool is considered as a passage or a recess provided at a lower end of the rear wall of the moon pool, an edge at the top side of such passage or recess, which then not is considered a lower end of the rear wall, can be located below the water line.

In embodiments, the second cavity can be defined at least partly by means of a ceiling connecting a rear wall of the moon pool with the downwardly sloping trailing wall. This ceiling blocks the flow from below and prevents that flow to excite waves. For example, said ceiling can extend from front to back in a substantially horizontal direction, e.g. a direction deviating less than 15° from a horizontal direction and/or from a longitudinal direction of the vessel or ship. As noted before, the horizontal direction may be considered as a direction which is horizontal when the vessel is floating on smooth waters, e.g. on a calm sea.

The ceiling of the rear cavity can thus be located substantially below the water line. At the location where a lower end of the downwardly, preferably substantially vertically, extending rear wall of the moon pool is connected with a front edge of the ceiling, a corner can be formed which points into the water. Said corner can then act as breakwater and may even further reduce sloshing in the moon pool. In view thereof, it may be advantageous when said corner is not substantially bevelled or rounded off. It is noted that said corner can for instance be considered as not substantially rounded off when a fillet radius is smaller than 10%, especially smaller than 5%, 2% or even 1% of the maximum height of the second cavity, and/or when it is smaller than 1 meter, especially smaller than 0.5, 0.2 or 0.1 meter. Further, said corner can for instance be considered not substantially bevelled when the portion cut off by a chamfer is located outside of a virtual fillet of said corner, which virtual fillet has a fillet radius smaller than 1 meter, especially smaller than 0.5, 0.2 or 0.1 meter and/or smaller than 10%, 5%, 2% or even 1% of the maximum height of the second cavity.

With respect to the first cavity, which is located at the front side of the moon pool, is noted that it can be at least partly defined by means of a leading wall sloping upwards in a rearward direction, e.g. sloping upwards in a direction substantially extending from a portion of the bottom surface of the hull located at a front side of the moon pool towards said moon pool. During use, the upwardly sloping leading wall may direct water to flow into the moon pool, especially into a moon pool part being located higher than the first cavity or so-called front cavity.

In embodiments, the first cavity can be substantially formed as a bevelled or so-called chamfered corner between a substantially upwardly extending front wall of the moon pool and a bottom surface of the hull located in front of the moon pool.

Advantageously, said upwardly sloping leading wall can substantially extend in a direction deviating from a longitudinal direction of the vessel or ship and/or from a substantially the horizontal direction under an angle of between 10° and 40°, preferably an angle larger than 15° or even larger than 20° and/or smaller than 35° or even smaller than 30°, such as for instance an angle of about 25°. As noted before, the horizontal direction may be considered as a direction which is horizontal when the vessel is floating on smooth waters, e.g. on a calm sea.

By forming the connection between the upwardly sloping leading wall of the first cavity and the bottom surface of the hull as a fillet, a spline or any continuous curve, water can enter the first cavity relatively smoothly, because a flow of water flowing along the bottom surface of the hull can then stay substantially attached to the hull when it arrives at the bottom end of said upwardly sloping leading wall. Preferably, if the connection is a fillet, said fillet has a relatively large fillet radius, for instance a fillet radius being at least 0.5 time the maximum height of the first cavity, in particular at least 1, 2 or 3 times said maximum height. Said fillet radius may be at least 5, 10 or 15 meters high. Since said water flowing relatively smoothly into the first cavity can become detached when travelling further through the first cavity, it can be counteracted that the flow detaches from the bottom of the hull upon reaching the front wall of the moon pool. Hence, moon pool sloshing may be diminished.

In advantageous embodiments, the connection between said upwardly sloping leading wall of the first cavity and the front wall of the moon pool can be substantially formed as an edge, especially a relatively sharp edge. Hence, a relatively abrupt transition can be formed between said upwardly sloping leading wall and the front wall of the moon pool. By forming said connection as an edge, it can be facilitated that a portion of the water flowing along the bottom of the hull, which portion subsequently flows along the upwardly sloping leading wall of the first cavity can separate from the hull relatively easily and can then travel into the moon pool. It may then thus be counteracted that the flow, or at least said portion, stays at least partly attached to the hull and travels upwards along the front wall of the moon pool.

By not providing a relatively smooth transition, e.g. formed by a fillet, between the sloping leading wall of the first cavity and the front wall of the moon pool, it can thus be counteracted that a flow of water flowing substantially along said sloping leading wall will deflect into a substantially upward direction along the front wall of the moon pool. To the contrary, the edge connecting the sloping leading wall and the front wall of the moon pool can facilitate that a flow of water flowing substantially along said sloping leading wall will separate from said leading wall in a substantially horizontal, rearward direction. It is noted that said separated flow can flow through the moon pool in a curved trajectory. In view thereof, it may be advantageous when said transition is formed by a corner that is not substantially bevelled or rounded off. It is noted that said corner can for instance be considered as not substantially rounded off when a fillet radius is smaller than 10%, especially smaller than 5%, 2% or even 1% of the maximum height of the first cavity, and/or when it is smaller than 1 meter, especially smaller than 0.5, 0.2 or 0.1 meter. Further, said corner can for instance be considered not substantially bevelled when the portion cut off by a chamfer is located outside of a virtual fillet of said corner, which virtual fillet has a fillet radius smaller than 1 meter, especially smaller than 0.5, 0.2 or 0.1 meter and/or smaller than 10%, 5%, 2% or even 1% of the maximum height of the first cavity.

In embodiments wherein the vessel comprises a first cavity with an upwardly sloping leading surface and a second cavity with a downwardly sloping trailing surface, it can be advantageous when the downwardly sloping trailing wall is steeper than the upwardly sloping trailing wall. Then, a flow guided along said upwardly sloping trailing wall can be guided into the moon pool in a relatively flat direction and can travel through the moon pool in a curved trajectory and can be diverged downwards relatively well by the relatively steep downwardly sloping trailing surface.

In a further aspect of the invention, the first cavity can be at least partly defined by means of a ceiling extending substantially horizontally, e.g. maximally deviating 15° from the horizontal direction and/or from the longitudinal direction of the vessel, and a front wall extending substantially upwardly from the bottom surface of the hull towards said ceiling of the first cavity. By arranging the first cavity with such front wall and such ceiling, a flow separation point, which in a conventional moon pool would be located at a corner between a front wall of the moon pool and the adjacent part of the bottom of the hull, is located relatively far upstream. As a result, oscillatory behaviour of the flowing water, vortexes in said water, and/or eddy currents, which are unwanted in the moon pool, will occur in the first cavity. The turbulence of a swirling flow, downstream of said separation point at the bottom of the front wall of the first cavity, can weaken substantially while traveling through said first cavity and/or the flow can be steered or streamlined to some extent by the ceiling above said flow. As a result of said first cavity arrangement, the flow separated from the hull bottom surface upstream of the moon pool may be steered to travel in a substantially straight line into the moon pool.

It is noted that a layer of water may be present between the flow in the first cavity and the ceiling of the first cavity, which layer can be relatively stationary with respect to said flow through the first cavity.

Further, it is noted that said upwardly extending front wall of the first cavity may be tilted to some extent. For instance, said front wall may be slanted forward or backward to such extent that a corner between said wall and the bottom surface of the hull is smaller than 90°, e.g. even smaller than 80°, 70° or 60°.

Advantageously, the first cavity can be substantially cuboid-shaped or so-called box-shaped. However, the first cavity may be formed differently. For example, the first cavity can be formed as a stepped cavity, i.e. a cavity having two or multiple ceilings located at different height levels, wherein a or each downstream ceiling is located higher than an adjacent upstream ceiling and wherein two ceilings are interconnected by means of an upwardly extending wall, which may be tilted to some extent.

Preferably, the connection between the front wall of the first cavity and the bottom surface of the hull can be substantially formed as an edge, especially a corner and/or as a relatively sharp edge, such that said connection may serve relatively well as a flow separation point. Said corner may not be substantially rounded off and not substantially chamfered corner. It is noted that said corner can for instance be considered as not substantially rounded off when a fillet radius is smaller than 10%, especially smaller than 5%, 2% or even 1% of the maximum height of the first cavity, and/or when it is smaller than 1 meter, especially smaller than 0.5, 0.2 or 0.1 meter. Further, said corner may be considered not substantially bevelled when the portion cut off by a chamfer is located outside of a virtual fillet of said corner, which virtual fillet has a fillet radius smaller than 1 meter, especially smaller than 0.5, 0.2 or 0.1 meter and/or smaller than 10%, 5%, 2% or even 1% of the maximum height of the first cavity. Instead of a fillet, a spline or any continuous curve may be used, and the connection may be rounded off instead.

By arranging the first or front cavity such that it has a length, which is measured from the front wall of said first cavity to the front wall of the moon pool, being greater than a height of said first cavity, which is measured from the level of the bottom surface of the hull to the ceiling of said first cavity, it may be facilitated relatively well that turbulence in the flow separated from the hull bottom surface in front of the cavity is weakened to a relatively large extend before said flow travels into the moon pool.

In embodiments, the ratio of the length of the first cavity divided by the mean height of said cavity can be at least 1.5, more preferably at least 2.5, 5 or 7.5.

Additionally or alternatively, the length of first cavity and/or the length of the or a ceiling thereof may be at least 20%, e.g. at least 25%, 30%, 40% or 50%, of the length of the moon pool, wherein said length of the moon pool can for instance be measured from the front wall of the moon pool to the rear wall of the moon pool.

Additionally or alternatively, the length of first cavity and/or the length of the or a ceiling thereof may be at least 5 meters, preferably at least 8, 10 or 15, meters.

By arranging the vessel such that the front wall of the moon pool extends further downwards than a rear wall of said moon pool, it can be facilitated that a substantially backward flow leaving the first cavity below said front wall, e.g. travelling substantially horizontally, can arrive at the rear end of the moon pool at a level below the rear wall of the moon pool, even if the flow is arriving at said end of the moon pool at a slightly higher level than the level of entrance into the moon pool. Said water may therefore at least partly be intercepted by a downwardly sloping trailing surface of the rear cavity located below said rear wall of the moon pool, and may subsequently be directed out of said rear cavity in a partly downward and partly rearward direction, preferably in relatively smooth manner.

Further, by letting the first cavity flare outward, it may be counteracted that the speed of water flowing into the moon pool through the first cavity may accelerate too much, and preferably it may be facilitated that said water flowing into the moon pool through the first cavity can be slowed down. By letting the second cavity flare outward, it can be counteracted that water flowing out of the moon pool through the second cavity may accelerate too much.

The invention further relates to the use of a vessel according to the invention, wherein said use comprises sailing with said vessel, especially without closing off the moon pool of said vessel, thus sailing while keeping the moon pool of said vessel open. After the vessel is used at a working location, e.g. during drilling activities, the vessel may then be brought into a transit mode relatively easily, safely and/or safely.

Advantageous embodiments according to the invention are described in the appended claims.

By way of non-limiting examples only, embodiments of the present invention will now be described with reference to the accompanying figures in which:

FIG. 1a shows a schematic cross-sectional view of a conventional vessel provided with a moon pool;

FIG. 1b shows a schematic detail of the schematic cross-sectional view of FIG. 1a, wherein vorticity of water in and near the moon pool is shown;

FIG. 2a shows a schematic cross-sectional view of a first embodiment of a vessel according to the invention, which vessel is provided with a moon pool;

FIG. 2b shows a first schematic detail of the schematic cross-sectional view of FIG. 2a, wherein vorticity of water in and near the moon pool is shown;

FIG. 2c shows a second schematic detail of the schematic cross-sectional view of FIG. 2a, wherein vorticity of water in and near the moon pool is shown;

FIG. 3b shows a schematic cross-sectional view of the vessel and the moon pool of FIG. 3a;

FIG. 4b shows a schematic cross-sectional view of the vessel and the moon pool of FIG. 4a;

FIG. 5b shows a schematic cross-sectional view of the vessel and the moon pool of FIG. 5a;

FIG. 6a shows a schematic cross-sectional view of a fifth embodiment of a vessel according to the invention, which vessel is provided with a moon pool; and FIG. 6b shows a schematic detail of the schematic cross-sectional view of FIG. 6a, wherein vorticity of water in and near the moon pool is shown.

It is noted that FIGS. 2a-6b show merely preferred embodiments according to the invention. In the figures, the same or similar reference signs or numbers refer to equal or corresponding parts.

Figure 3A:
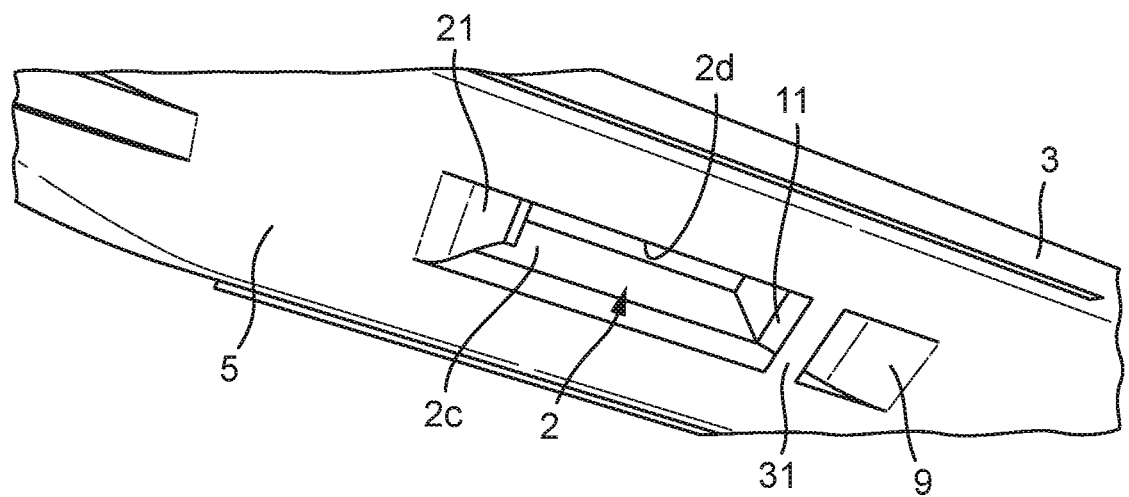
FIG. 3a shows a schematic, partly cut away, perspective view of a second embodiment of a vessel according to the invention, which vessel is provided with a moon pool.
Figure 3B:
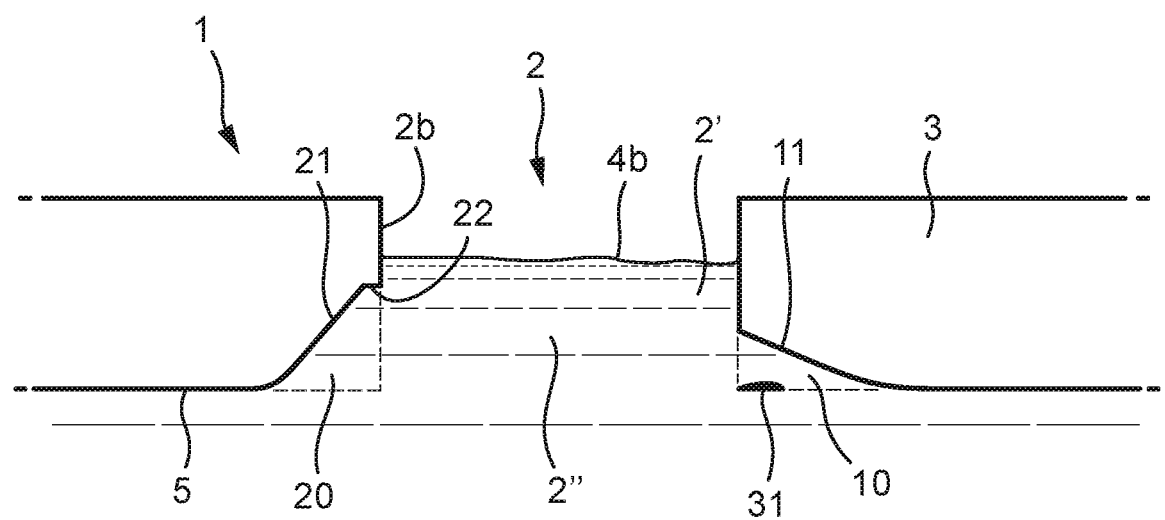

FIG. 1a shows a schematic cross-sectional view of a conventional vessel 1, e.g. a drillship 1, provided with a moon pool 2 and FIGS. 2a-6b show embodiments of vessels 1, e.g. drillships 1, especially deep water drillships, according to the invention, provided with a moon pool 2. The vessel 1 can have a bow 3a at a front side 1a of the vessel 1 and a stern 3b at a rear side 1b of the vessel 1, and the vessel 1 can substantially extend in a longitudinal direction from said bow 3a towards said stern 3b.

The moon pool 2 may provide an opening 2 in the hull 3 of the vessel 1 to allow access to the water 4 below the bottom surface 5 of the hull 3. Usually, the moon pool 2 is located at or near the centre 3c of the hull 3 of the vessel 1. Additionally or alternatively, the moon pool 2 can be formed a walled passage 2 or hole 2 in the hull 3 of the vessel 1 and may for instance have a substantially tubular shape. The passage 2 formed by the moon pool 2 may extend in a substantially vertical direction 6 and can then for instance have a substantially horizontal cross-section having a substantially rectangular shape, such as for instance a substantially square shape. Since the moon pool 2 can be of a substantially tubular design, horizontal cross-sections at different height levels may have substantially the same form and substantially the same dimensions.

The moon pool 2 may have a substantially upwardly extending front wall 2a and/or a substantially upwardly extending rear wall 2b. The respective wall 2a, 2b, which may extend at least along a top portion 2' of the moon pool 2, may extend substantially transverse to the longitudinal direction of the vessel 1 and/or may extend substantially vertically.

Figure 4A:
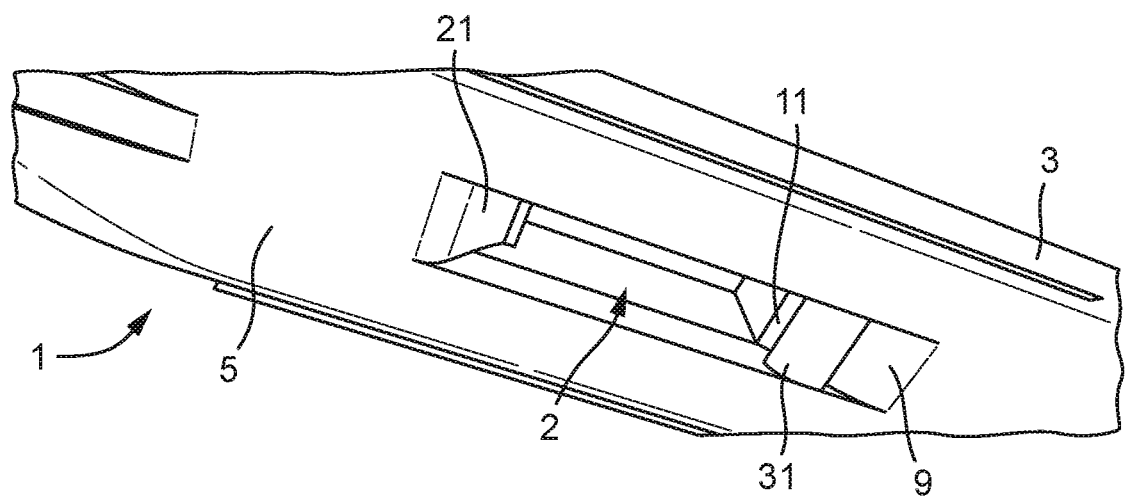
FIG. 4a shows a schematic, partly cut away, perspective view of a third embodiment of a vessel according to the invention, which vessel is provided with a moon pool.
Figure 4B:
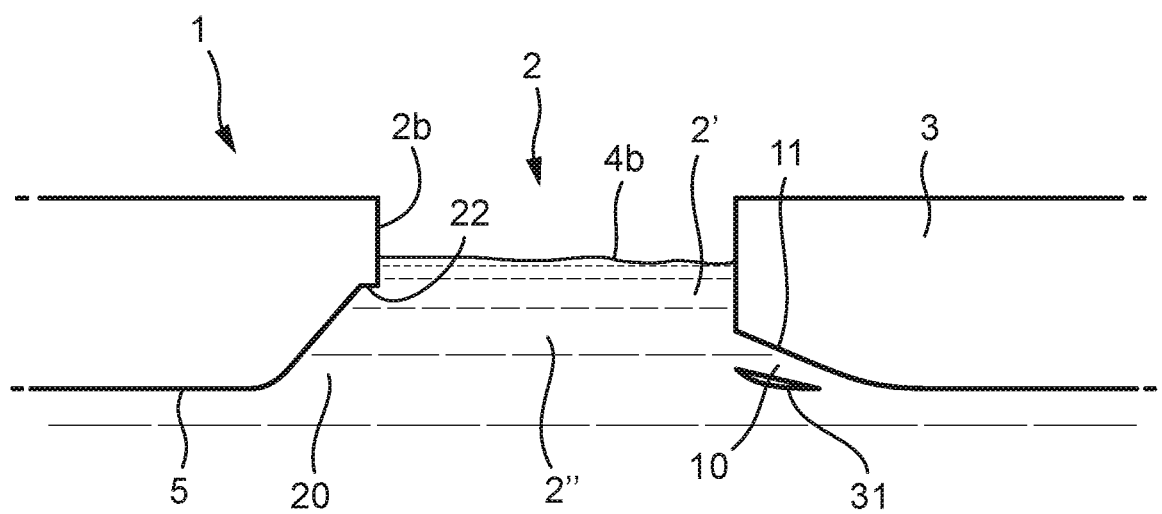

Further, the moon pool 2 may comprise two side walls 2c, 2d, which may for instance extend substantially vertically and/or substantially in the longitudinal direction of the vessel 1, as for instance can be seen in the exemplary embodiments of FIGS. 3a and 4a.

It is noted the vessel 1 may be arranged such that the moon pool 2 can during use be located at the waterline 4a, 4b, e.g. such that the front wall 2a, rear wall 2b and side walls 2c, 2d thereof are partly extending above and partly extending below said waterline 4a, 4b. Further, it is noted that the moon pool 2 can be a so-called open moon pool, which is open to the air above, such that the moon pool 2 is not formed as an airtight chamber in the vessel 1, but is at least partly open, preferably at least partly open at or near a top side of the moon pool 2.

As can be seen in FIG. 1b, which shows a schematic detail of the schematic cross-sectional view of FIG. 1a and which further shows vorticity of water in and near the moon pool 2 when the vessel 1 is sailing in a forward direction, a flow 41 of water is flowing backwards (i.e. relative to the vessel 1) below a front portion of the bottom surface 5 of the hull 3, which front portion is located in front of the moon pool 2. Said flow 41 is a relatively calm, laminar or streamlined flow, as can be seen in FIG. 1b. However, when said flow 41 reaches the underside of a front wall 2a of the moon pool 2 and separates from the hull 3, the flow 42 becomes much more turbulent at a region downstream of the separation point 5a. Said turbulent flow 42 may cause vortex shedding and/or eddy currents or flows behind the front wall 2a of the moon pool. As a flow 41 of water below the front part of the vessel 1 may at least partly flow into the moon pool 2, a water flow 43 can at least partly be reflected by a rear wall 2b of the moon pool 2, resulting in surface waves 4c, especially relatively large waves, can be formed at the water line 4b in the moon pool 2 and so-called moon pool sloshing can occur. These surface waves may induce and amplify vorticity and oscillatory behaviour of flow 42 which may even cause more moon pool sloshing.

In the vessel 1 according to the invention, of which different embodiments are shown in FIGS. 2a-6b, the vessel 1 comprises a hull 3 having a bottom surface 5 and a deck 7, wherein said vessel 1 is provided with a moon pool 2 extending from said bottom surface 5 of the hull 3 in an upward direction through the hull 3. Further, said vessel 1 is provided with a cavity 10 located at a front side of the moon pool 2, wherein said cavity 10 is at least partly open at a bottom side 10a thereof in order to allow water to flow into said cavity 10, and wherein said cavity 10 is at least partly open at a rear side 10b of said cavity 10 in order to allow water to flow directly from said cavity 10 into the moon pool 2. Hence, it may for example be facilitated that, when the vessel 1 is sailing forwards, e.g. at speeds of at least 5, 8, 10 or 12 knots, such as about 14 or 15 knots, a water flow 41, which follows the lower surface of the hull 5 and can be considered as so-called attached to said lower surface of the hull 3, will not become substantially separated from said lower surface 5 of the hull 3 at a separation point (5a, FIG. 1b) at or near the bottom of a front wall 2a of the moon pool 2, but will for instance substantially separate from said lower surface 5 of the hull 3 substantially at a separation point 5b (see FIG. 6a) located upstream of the moon pool 2 or will for instance substantially separate from the lower surface 5 of the hull 3 substantially at a separation trajectory 5c (see FIGS. 2b and 2c) located upstream of the moon pool 2, e.g.

at least partly inside said so-called front cavity 10. As a result, the occurrence of oscillatory behaviour of water can mainly take place in the front, first cavity 10 and thus upstream of the moon pool 2, such that can be facilitated that relatively little sloshing occurs in the moon pool 2 resulting in relatively good sailing properties, e.g. a relatively low flow resistance of the vessel 1.

Preferably, said first cavity 10 can be relatively shallow, e.g. in comparison to the height of the moon pool 2 and/or in comparison to the height of the front wall 2a of the moon pool 2. Additionally or alternatively, as can be seen in FIGS. 2b, 3b, 4b, 5b and 6b for instance, the first cavity 10 can have a length being greater than a height of said cavity 10.

Figure 5A:
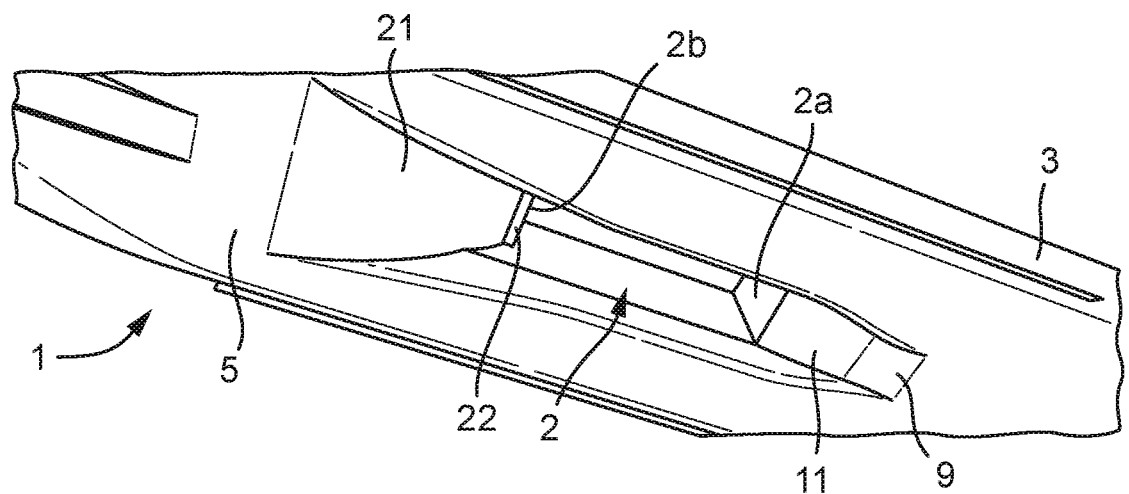
FIG. 5a shows a schematic, partly cut away, perspective view of a fourth embodiment of a vessel according to the invention, which vessel is provided with a moon pool.

In advantageous embodiments, such as for instance in the exemplary embodiment of FIG. 5a, the front cavity 10 may broaden out towards its rear side. This is, at a front end of the front cavity 10, said cavity 10 can have a relatively small width, e.g. a width being smaller than the width of the moon pool 2 at the location where the front cavity 10 is connected to said moon pool 2. By letting the front cavity 10 flare outward towards it rear end, it may be counteracted that the speed of water flowing into the moon pool 2 through the front cavity 10 will accelerate too much, and preferably it may be facilitated that said water flowing into the moon pool 2 through the front cavity 10 can be slowed down. As a result, water may flow relatively calmly from the front cavity 10 into the moon pool 2, thereby counteracting turbulence, moon pool sloshing and/or drag. As result, sailing performances of the vessel 1 may be relatively good.

In embodiments of the vessel 1 according to the invention, the vessel 1 may further be provided with a second cavity 20 or so-called rear cavity 20, which is located at a rear side of the moon pool 2. In such cases, the second cavity 20 is at least partly open at a front side and at a bottom side thereof. Therefore, water, flowing into the moon pool 2 from the first cavity 10 and/or flowing into the moon pool 2 at an open bottom side of said moon pool 2, can flow into the second cavity 20 relatively easily. It is noted that this is advantageously over a conventional design, wherein a rear wall 2b of the moon pool 2 may bounce (43, FIG. 1b) a relatively large amount of such water back, i.e. in a forward direction into the moon pool 2. Due to an optional arrangement with such a second cavity 20, moon pool sloshing can be reduced even further.

Advantageously, said second cavity 20 can at least partly be defined by means of a trailing wall 21 which slopes downwardly in a rearward direction to allow water 44 which flows through the moon pool 2 from the front cavity 10 towards the second cavity 20 can be diverged in a downward direction 45, i.e. away from the moon pool 2, in a relatively smooth manner, thereby counteracting moon pool sloshing. As can be seen in FIGS. 2a and 2b, the downwardly sloping trailing wall 21 may be steeper than the upwardly sloping leading wall 11.

As for instance can be seen in FIGS. 2a, 3b, 4b and 5b, the connection 5d between the downwardly sloping trailing wall 21 and the bottom surface 5 of the hull 3 can be formed by a fillet, spline or any continuous curve 5d.

Figure 5B:
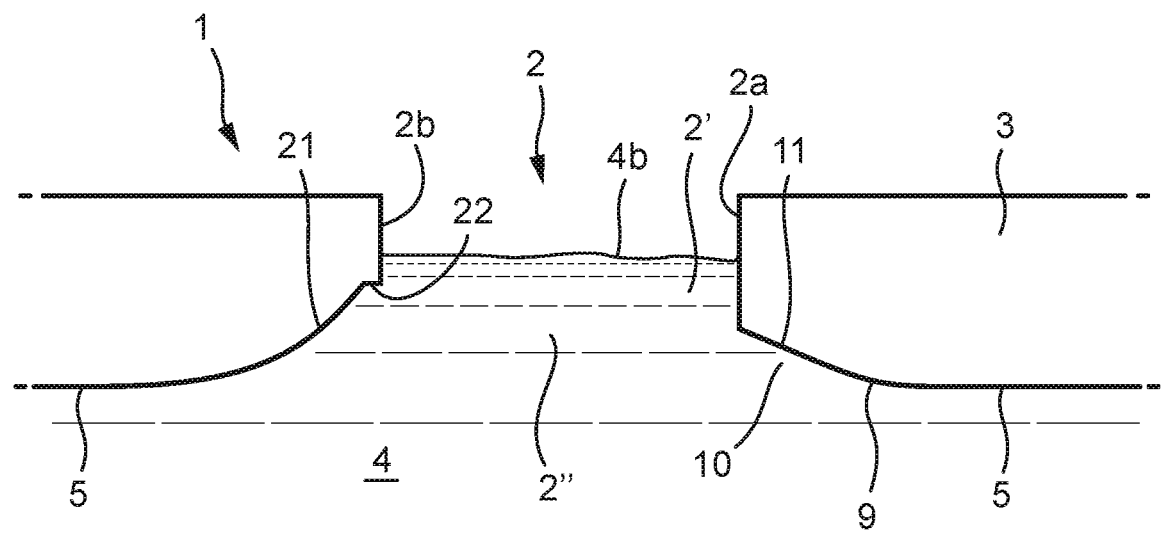

Although the downwardly sloping trailing wall 21 of the second cavity 20 can be substantially formed as a substantially straight surface 21, as for instance can be seen in FIGS. 2a, 2b, 3b and 4b, the downwardly sloping trailing wall 21 of the second cavity 20 may alternatively be formed substantially as a bent or curved surface, preferably a convex surface, such as for instance is the case in the exemplary embodiment of FIGS. 5a-5b. For example, said downwardly sloping trailing wall 21 can be formed at least partly as a fillet, preferably a fillet connected substantially smoothly to the bottom surface 5 of the hull 3.

By forming at least a part of the downwardly sloping trailing wall 21 and/or a connection between said trailing wall 21 and the bottom surface 5 of the hull 3 as a fillet, water leaving the moon pool 2, which water can flow along the downwardly sloping trailing wall 21, can subsequently flow along the bottom 5 of the hull 3 in a substantially continuous manner, which may counteract turbulence and which therefore can counteract drag.

For example in order to further improve the sailing performances of the vessel 1, the downwardly sloping trailing wall 21 of the rear cavity 20 may broaden out towards its rear end, such as for instance is the case in the exemplary embodiment shown in FIG. 5a. By letting the rear cavity 20 flare outward, it can be counteracted that water flowing out of the moon pool 2 through the rear cavity 20 will accelerate too much. Actually, by providing a rear cavity 20 fanning out in the width direction of the vessel 1, the water flowing through said cavity 20 will flow relatively calm, and advantageously the water flow may at least partly be attached substantially to the downwardly sloping trailing wall 21 and stay subsequently substantially attached to the lower surface 5 of the hull 3. Consequently, turbulence, and therefor drag, can be counteracted to at least some extent by the fanning out of the rear cavity 20, as result of which sailing performances of the vessel 1 may be relatively well.

Additionally or alternatively, as for example can be seen in FIGS. 2a, 2b, 3b, 4b and 5b, the second cavity 20 can be defined at least partly by means of a ceiling 22 connecting a rear wall 2b of the moon pool 2 with the downwardly sloping trailing wall 21.

This ceiling blocks any deflected flow from below and prevents that flow to excite waves on the surface. For example, said ceiling 22 can extend substantially horizontally. In embodiments, said ceiling 22 may be slightly sloping with respect to the horizontal plane, e.g. sloping in a rearward or in forward direction. For example, the slightly sloping ceiling 22 may slope within a range of −15° to +15° with respect to the horizontal plane, such as for instance within a range of −10° to +10°, or even within a range of −5° to +5°.

Since said ceiling 22 of the rear cavity 20 may advantageously be located substantially below the water line 4a, 4b, a corner 8 joining a lower end of the rear wall 2b of the moon pool 2 with a front edge of said ceiling 22 of the second cavity 20 may be pointed into the water and may act as breakwater 8, which may reduce sloshing in the moon pool 2 even further.

It is noted that utilizing a cavity 20, or so-called rear cavity 20, located at a rear side of a moon pool 2, wherein said cavity 20 is at least partly open at a front side of said cavity 20 in order to allow water to flow from said moon pool 2 directly into said cavity 20, and wherein said cavity 20 is at least partly open at a bottom side thereof in order to allow water to flow out of said cavity 20, can also be advantageous when no cavity 10 is located at the front side of the moon pool 2, or wherein a front cavity is located at the front side of the moon pool 2, but wherein said front cavity is not open at both a bottom side 10a and a rear side 10b thereof.

As for instance can be seen in the exemplary embodiments of FIGS. 3a-4b, one or multiple hydrofoils 31 may be provided in and/or below the front cavity 10, which cavity 10 is at least partly open at a bottom side 10a and at a rear side 10b thereof. The hydrofoil 31, which can be formed as wing-like or spoiler-like structure 31, may be arranged to direct a water flow into the moon pool 2, especially at least partly into a top portion 2' thereof, e.g. in order to further limit turbulence and drag. Additionally or alternatively, the hydrofoil 31 can counteract that the water flow flowing though the front cavity 10 accelerates to a relatively large extent and/or may even slow down said water flow.

It is noted that the present disclosure does thus also relate to a vessel 1, comprising a hull 3 having a bottom surface and a deck, wherein said vessel is provided with a moon pool extending from said bottom surface of the hull in an upward direction through the hull, wherein the vessel is further provided with a rear cavity located at a rear side of the moon pool, wherein said rear cavity 20 is at least partly open at a front side of said rear cavity in order to allow water to flow from said moon pool 2 directly into said rear cavity 20, and wherein said rear cavity 20 is at least partly open at a bottom side thereof in order to allow water to flow out of said rear cavity, wherein the rear cavity is at least partly defined by means of a trailing wall 21 sloping downwards in a rearward direction, e.g. in a direction substantially extending from the moon pool towards a portion of the bottom surface 5 of the hull 3 located at a rear side of the moon pool 2, wherein the rear cavity is at least partly defined by means of a ceiling 22 connecting a rear wall 2b of the moon pool 2 with the downwardly sloping trailing wall 21. It is further noted that although such vessel may also be provided with a front cavity 10, such front cavity 10 may also be omitted. Advantageously, a lower end of the rear wall 2b of the moon pool, and/or the ceiling 22, may during use, e.g. during sailing of the vessel, be located below the water line 4b of water located in the moon pool 2.

As can be seen in the exemplary embodiments shown in FIGS. 2a-2c, which embodiments comprise a first cavity or a so-called front cavity, the first cavity 10 located in front of the moon pool 2 may in embodiments be at least partly defined by means of a leading wall 11 which slopes upwards in a rearward direction. During use of the vessel 1, in particularly during sailing, the upwardly sloping leading wall 11 may direct water to flow into the moon pool 2, especially into a moon pool part 2' being located at a higher height level than the first cavity 10. Additionally, the first cavity 10 may at least partly be defined by a bevelled or so-called chamfered corner between a substantially upwardly extending front wall 2a of the moon pool and a part of the bottom surface 5 of the hull 3 located in front of the moon pool 2.

As best can be seen in FIG. 2c, the connection between the upwardly sloping leading wall 11 of the first cavity 10 and the bottom surface 5 of the hull 3 may be formed as a fillet, spline or any continuous curve 9, such that can be facilitated that water can enter the first cavity 10 relatively smoothly. Additionally or alternatively, the connection 5e between said upwardly sloping leading wall 11 of the first cavity 10 and the front wall 2a of the moon pool 2 can be substantially formed as an edge, especially a relatively sharp edge.

Although the upwardly sloping leading wall 11 of the first cavity 10 can be substantially formed as a substantially straight surface 11, as for instance can be seen in FIGS. 2a-2c and 5a-5b, the upwardly sloping leading wall 11 of the first cavity 10 may alternatively be formed as a bent or curved surface, preferably a convex surface. For example, said upwardly sloping leading wall 11 can be formed at least partly as fillet, preferably a fillet connected substantially smoothly to the bottom surface 5 of the hull 3.

In a further aspect of the invention, an exemplary embodiment of which is shown in FIGS. 6a and 6b, the first cavity 10 can be at least partly defined by means of a ceiling 12 extending substantially horizontally and a front wall 13 extending substantially upwardly from the bottom surface 5 of the hull 3 towards said ceiling 12 of the first cavity 10. By arranging the first cavity 10 in this manner, a flow separation point 5b is located relatively far upstream of the moon pool 2. Hence, it can be facilitated that oscillatory behaviour 46 of the flowing water 46, vortexes 46 in said water, and/or eddy currents, which are unwanted in the moon pool 2, may occur mainly inside the first cavity 10 and/or mainly at a location substantially away from the moon pool 2. Moreover, it may be facilitated that the flow separated from the hull bottom surface 5 upstream of the moon pool 2 can be steered, at least to some extent, to travel into the moon pool 2 in a substantially straight or single curved line, e.g. a substantially horizontal line and/or a line directed partly in a downward direction at a rear side thereof.

It is noted that for the purpose of clarity and a concise description features are described herein as part of the same or separate embodiments, however, it will be appreciated that the scope of the invention may include embodiments having combinations of all or some of the features described.

It is noted that features and aspects that are shown and/or described in the context of a vessel with a moon pool provided with a first cavity, or so-called front cavity, in front of said moon pool, are considered to be also disclosed in the context of a vessel with a moon pool that does not comprise such front cavity.

Further, it is noted that the invention is not restricted to the embodiments described herein. It will be understood that many variants are possible.

For example, the vessel, which can be a drillship, may be provided with other elements, e.g. devices, such as for instance a propulsion device and/or a drilling rig, such as for example a semi-submersible drilling rig.

Such and other variants will be apparent for the person skilled in the art and are considered to lie within in the scope of the invention as formulated in the following claims

The invention claimed is:

1. A vessel, comprising a hull having a bottom surface and a deck, wherein said vessel is provided with a moon pool extending in a vertical direction through the hull, wherein said vessel is further provided with a first cavity located adjacent a front vertical wall of the moon pool, wherein said first cavity is at least partly open at a bottom side thereof in order to allow water to flow into said first cavity, and wherein said first cavity is at least partly open at a rear side of said first cavity in order to allow water to flow directly from said first cavity into the moon pool,
   wherein said front vertical wall of said moon pool extends to an upper edge of the rear side of the first cavity, but does not extend to a depth corresponding to said bottom surface of the hull, said first cavity being at least partly defined by a leading wall extending from the bottom surface of the hull to said upper edge of the rear side of the first cavity and sloping upwards at said upper edge, said upper edge being formed by a connection between said front vertical wall of said moon pool and said leading wall,
   wherein a length of the first cavity in a horizontal direction, along said bottom side and extending from said rear side of the first cavity to said bottom surface of the hull, is at least 5 meters, said horizontal direction being a direction of motion of said vessel and perpendicular to said vertical direction.

2. The vessel according to claim 1, wherein the vessel is further provided with a second cavity, wherein the second cavity is located at a rear vertical wall of the moon pool, wherein said second cavity is at least partly open at a front side of said second cavity in order to allow water to flow from said moon pool directly into said second cavity, and wherein said second cavity is at least partly open at a bottom side thereof in order to allow water to flow out of said second cavity.

3. The vessel according to claim 2, wherein the second cavity is at least partly defined by a trailing wall sloping downwards in a rearward direction from the moon pool towards the bottom surface of the hull.

4. The vessel according to claim 3, wherein the trailing wall substantially forms a chamfer connecting a rear vertical wall of the moon pool with the bottom surface of the hull.

5. The vessel according to claim 3, wherein the second cavity is at least partly defined by a ceiling connecting a rear vertical wall of the moon pool with the trailing wall.

6. The vessel according to claim 3, wherein a connection between the trailing wall and the bottom surface of the hull, or at least a part of the trailing wall, is formed by a fillet, spline or any continuous curve.

7. The vessel according to claim 2, wherein a lower end of the rear vertical wall of the moon pool is configured for, during use, being located below the water line.

8. The vessel according to claim 2, wherein the first cavity and/or the second cavity is flaring outwardly.

9. The vessel according to claim 1, wherein the leading wall slopes upwards along an entire length of extension from the bottom surface of the hull to said upper edge of the rear side of the first cavity.

10. The vessel according to claim 9, wherein a connection between said leading wall of the first cavity and the bottom surface of the hull, or at least a part of the leading wall, is formed by a fillet, spline or any continuous curve.

11. The vessel according to claim 9, wherein the upper edge of the rear side of the first cavity is a sharp edge.

12. The vessel according to claim 1, wherein a connection between the leading wall of the first cavity and the bottom surface of the hull is a sharp edge.

13. The vessel according to claim 1, wherein the first cavity has a height in the vertical direction that is less than the length of the cavity in the horizontal direction.

14. The vessel according to claim 1, wherein the front vertical wall of the moon pool extends further downwards than a rear vertical wall of said moon pool.

15. The vessel according to claim 1, wherein the vessel is a drillship or so-called drilling ship.

16. A method of using the vessel according to claim 1, the method comprising sailing the vessel while keeping the moon pool of said vessel open.

17. The vessel according to claim 1, wherein said rear side of said first cavity and said front vertical wall of said moon pool coincide and extend in the vertical direction.

18. A vessel, comprising a hull having a bottom surface and a deck, wherein said vessel is provided with a moon pool extending in a vertical direction through the hull, wherein said vessel is further provided with a first cavity located adjacent a front vertical wall of the moon pool and a second cavity located adjacent a rear vertical wall of the moon pool, wherein the front vertical wall of the moon pool extends further downwards than a rear vertical wall of said moon pool
  wherein said first cavity is at least partly open at a bottom side thereof, said bottom side coinciding with, and extending to a front side edge of, said bottom surface of the hull, and
  wherein said first cavity is at least partly open at a rear side thereof, said rear side coinciding with, and extending to an upper edge of, said front vertical wall of the moon pool,
  whereby the first cavity is configured to flow water, during horizontal motion of the vessel, into said bottom side of said cavity, out of said rear side of said cavity, and into said moon pool, wherein a length of the first cavity in a horizontal direction, along said bottom side and extending from said rear side of the first cavity to said bottom surface of the hull, is at least 20% of a length of the moon pool in the horizontal direction, between the front vertical wall and a rear vertical wall of the moon pool, said horizontal direction being a direction of motion of said vessel and perpendicular to said vertical direction.

* * * * *